(12) United States Patent
Usui et al.

(10) Patent No.: US 12,346,247 B2
(45) Date of Patent: Jul. 1, 2025

(54) SYSTEM AND METHOD FOR INTELLIGENT TEST ENVIRONMENT ALLOCATION

(71) Applicant: WOVEN BY TOYOTA, INC., Tokyo (JP)

(72) Inventors: Hiroyuki Usui, Tokyo (JP); Go Matsukawa, Edogawa-ku (JP); Motofumi Kashiwaya, Tokyo (JP); Noriyasu Hashiguchi, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 111 days.

(21) Appl. No.: 18/193,755

(22) Filed: Mar. 31, 2023

(65) Prior Publication Data
US 2024/0330155 A1    Oct. 3, 2024

(51) Int. Cl.
G06F 9/44        (2018.01)
G06F 11/3668     (2025.01)
G06F 11/3698     (2025.01)

(52) U.S. Cl.
CPC ...... *G06F 11/3698* (2025.01); *G06F 11/3696* (2013.01)

(58) Field of Classification Search
None
See application file for complete search history.

(56) References Cited

U.S. PATENT DOCUMENTS

| | | | |
|---|---|---|---|
| 11,314,907 B2* | 4/2022 | Phatak | G06F 9/5027 |
| 2021/0049093 A1* | 2/2021 | Kaitha | G06F 11/3688 |
| 2022/0058113 A1* | 2/2022 | Mizoguchi | G06F 11/3664 |
| 2024/0015046 A1* | 1/2024 | Miao | G06F 11/3688 |

FOREIGN PATENT DOCUMENTS

| | | |
|---|---|---|
| CN | 115391165 A | 11/2022 |
| JP | 2018-32392 A | 3/2018 |
| JP | 2020-107133 A | 7/2020 |

OTHER PUBLICATIONS

"Nagoya 2019 Automotive Engineering Exposition", Jul. 17, 2019, pp. 13-15.

* cited by examiner

*Primary Examiner* — Qamrun Nahar
(74) *Attorney, Agent, or Firm* — Sughrue Mion, PLLC

(57) ABSTRACT

Provided are a system, method, and device for intelligent test environment allocation. According to embodiments, the method for intelligently determining one or more test environments for testing software of an embedded system, may include: obtaining, by a task allocator, capability information of a plurality of test environments; obtaining, by the task allocator, policy information of a task to be executed for testing the software of the embedded system; determining, by the task allocator, a test environment, from among the plurality of test environments, that satisfies the policy information; and allocating, by the task allocator, the task to the determined test environment, wherein the embedded system may be an in-vehicle electronic control unit (ECU), and wherein the plurality of tests environments may include at least one software-in-the-loop (SIL) test environment, at least one hardware-in-the-loop (HIL) test environment, and at least one virtual ECU (V-ECU) test environment.

14 Claims, 10 Drawing Sheets

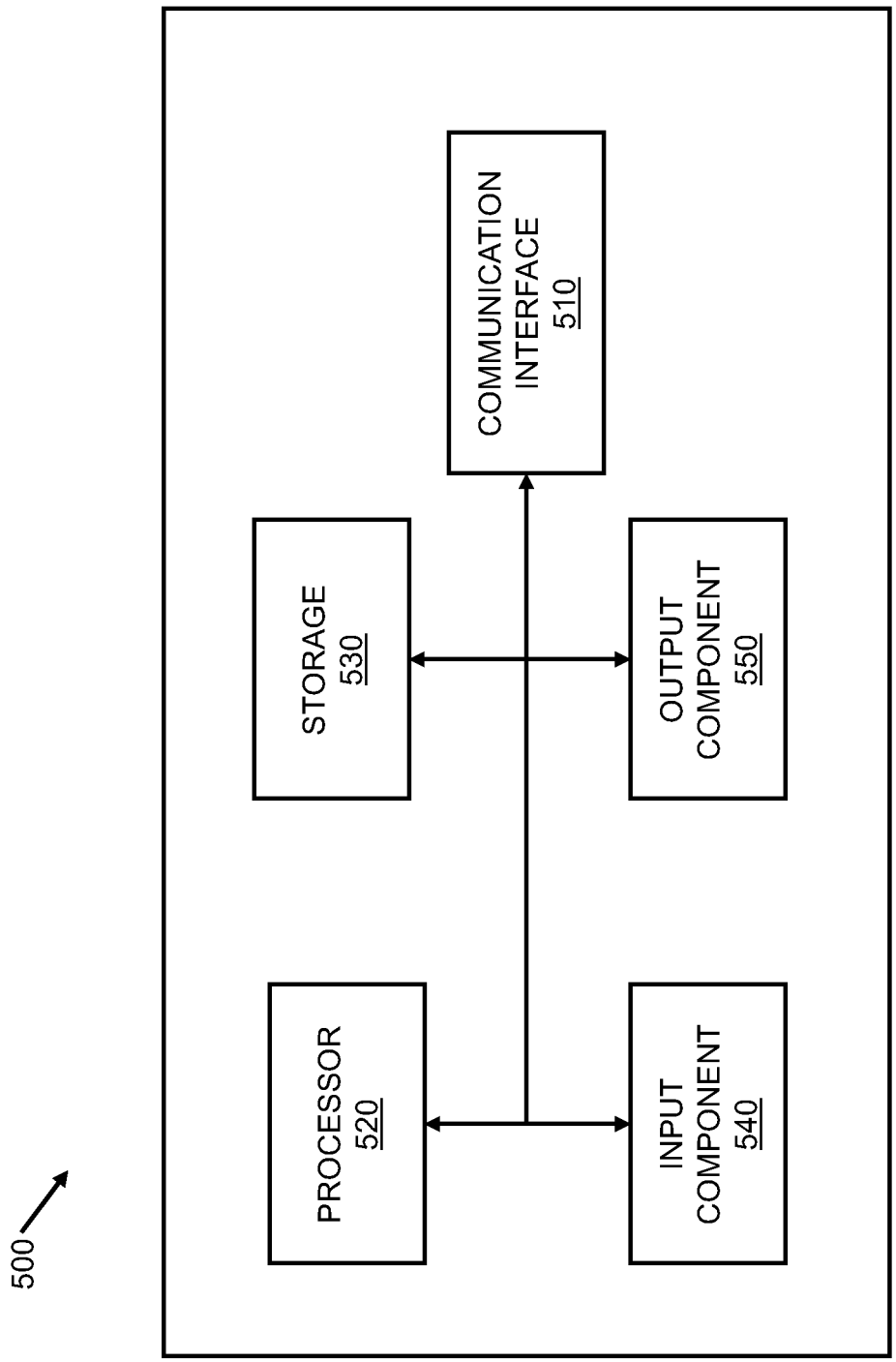

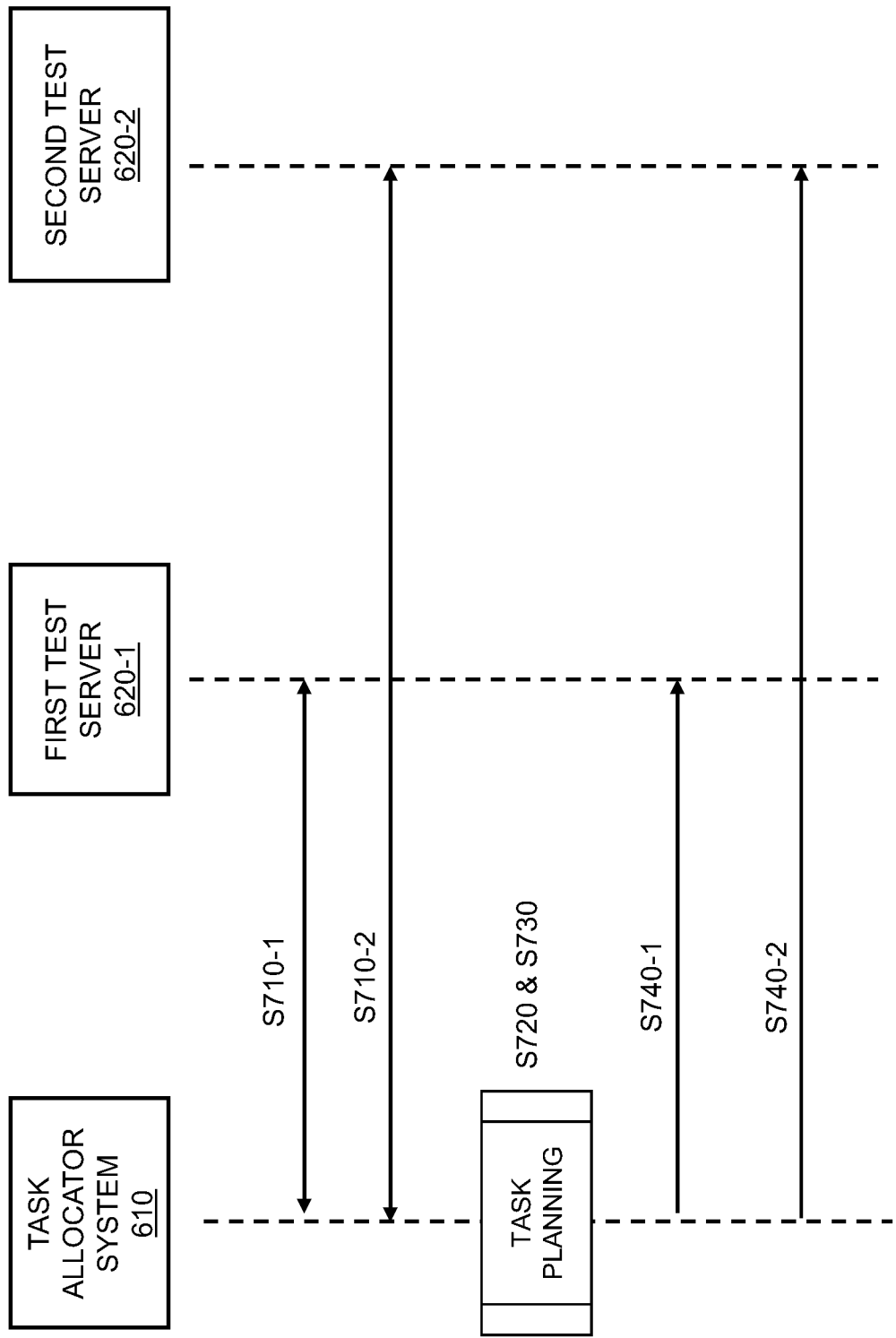

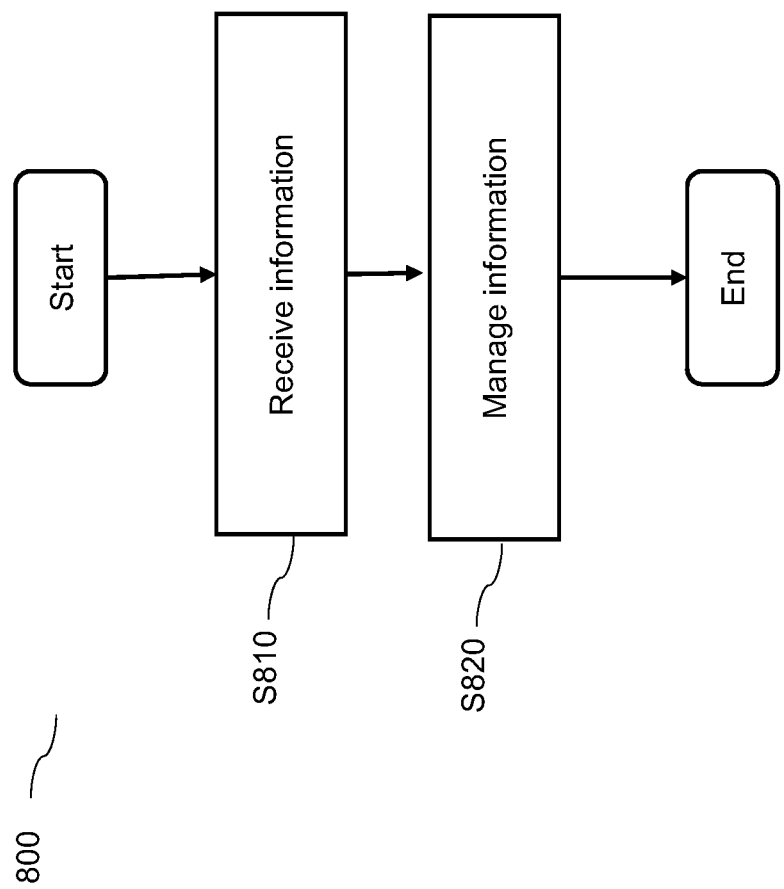

SYSTEM AND METHOD FOR INTELLIGENT TEST ENVIRONMENT ALLOCATION

TECHNICAL FIELD

Systems and methods consistent with example embodiments of the present disclosure relate to a test environment, and more particularly, relate to systems and methods for intelligently allocating or determining a test environment for testing a system.

BACKGROUND

In the related art, various test environments have been introduced to test functionality and software performance of a system. By way of example, an embedded system of a vehicle, such as an electronic control unit (ECU), may be tested by utilizing, among others, at least one software-in-the-loop (SIL) test environment, at least one hardware-in-the-loop (HIL) test environment, and at least one virtual ECU (V-ECU) test environment.

For instance, the SIL test environment may utilize a SIL Simulator (SiLS) to evaluate or simulate the implementation of the system on generic or general-purpose hardware, instead of the actual ECU where the system is purposed to run. The SIL test environment enables multiple tests to be performed in parallel, and may enable testing of a partially developed product (e.g., partially virtualized hardware, etc.) before the product is fully developed. As a result, the SIL test environment generally offer faster testing simulations with high scalability and lower cost. Nevertheless, the SIL test environment is less credible and less accurate as the underlying hardware is generic and/or may be different from the actual system under test.

On the other hand, the HIL test environment may utilize a HIL Simulator (HiLS) communicatively coupled to an actual element (e.g., a physical ECU) to thereby evaluate or test the actual system (e.g., the physical ECU) where the system is purposed to run, thereby providing highly credible test results as the real operating environment is faithfully reproduced. Nevertheless, performing a test with the HIL test environment may be expensive, time-consuming (e.g., due to low scalability), and cannot provide a large number of parallel testing/simulations given the numerical limitation of the available hardware.

In the middle, the V-ECU test environment may reproduce or emulate the specific ECU environment and functionality in software such that the test result thereof is more credible and more accurate than SIL test environment. Further, the V-ECU test environment consumes less cost (e.g., less expensive, etc.) than the HIL test environments and therefore more scalable and amenable to large number of simultaneous test scenarios. Further, the V-ECU test environment may also enable parallel testing. However, the V-ECU test environment may not fully emulate the ECU under test (e.g., system-on-chip (SoC) may not be emulated, etc.) and is limited in terms of the actual hardware/product functions it can reproduce. Moreover, it may be difficult to accurately reproduce ECU when the associated information is not fully known (e.g., in cases where the hardware model is kept confidential by the vendor thereof, etc.). Additionally, V-ECU test environment requires the conversion of the test object (i.e., one or more ECUs) into software form (e.g., virtual ECU, etc.), thus may not be suitable to provide instant testing or simulation.

In view of the above, each of the test environments (e.g., SIL, HIL, V-ECU, etc.) or methodologies offers various trade-offs of costs and benefits. Thus, selection and allocation of an appropriate test environment is crucial for optimizing a test and for satisfying variable test requirements. Nevertheless, the test environment selection and allocation of a task (e.g., test to be executed, etc.) to the test environment in the related art is not optimal and have several limitations and deficiencies as follows.

At the first place, related art systems and methods only involve either a plurality of test environment of a same type, or determination of test environment between generic test environments, such as either HIL or SIL test environments, without any feature or algorithm to leverage all available test environments and methodologies (including V-ECU test environment). Namely, related art systems and methods are unable to intelligently determine or allocate a specific test environment which best fitting the specific user needs and/or test requirements.

Further, in the development of an embedded system (e.g., a software for a vehicle, etc.), there is a need to test software at various stages of its development. Being limited to a single type of test environment may not be optimal in the development cycle. For example, while the HIL test runs are most accurate, they may not be suitable in the early phase of software development, particularly where the associated hardware (e.g., ECU, SoC, etc.) development has not yet been completed. Also, when using the HIL test environment, the software development may be delayed as it takes a long time to run a large number of scenarios due to the small number of hardware environments available for testing.

SUMMARY

According to embodiments, methods, systems, and devices are provided for intelligently determining one or more test environments for testing software of an embedded system. Specifically, example embodiments of the present disclosure may utilize a plurality of test environments in which one or more tasks (e.g., test executions, etc.) are intelligently allocated, thereby enabling multiple tasks to be simultaneously run or be executed in the plurality of test environments under various testing requirements or conditions. Further, by utilizing capability information of the test environments, one or more tasks can be intelligently allocated to optimize the testing or simulation, while satisfying the variable requirements (speed, cost, etc.) of the one or more tasks.

According to embodiments, a method for intelligently determining one or more test environments for testing software of an embedded system is provided, the method may include: obtaining, by a task allocator, capability information of a plurality of test environments; obtaining, by the task allocator, policy information of a task to be executed for testing the software of the embedded system; determining, by the task allocator, a test environment, from among the plurality of test environments, that satisfies the policy information; and allocating, by the task allocator, the task to the determined test environment, wherein the embedded system may be an in-vehicle electronic control unit (ECU), and wherein the plurality of tests environments may include at least one software-in-the-loop (SIL) test environment, at least one hardware-in-the-loop (HIL) test environment, and at least one virtual ECU (V-ECU) test environment.

According to embodiments, the capability information may include at least one of processor speed, supported ECU functions, supported instruction sets, and usage cost.

According to embodiments, the method may further include: receiving, by the task allocator, a test result of the allocated task from the determined test environment; and updating, by the task allocator, the capability information of the determined test environment based on the received test result.

According to embodiments, the method may further include: determining, by the task allocator, another test environment, from among the plurality of test environments, based on the received test result; and allocating, by the task allocator, the task to the determined other test environment.

According to embodiments, the obtaining the policy information may include obtaining the policy information of a plurality of tasks; the determining the test environment may include determining plural tests environments, from among the plurality of tests environments, for respectively allocating the plurality of tasks based on the policy information; and the allocating the task may include allocating the plurality of tasks for simultaneous execution in the plurality of test environments.

According to embodiments, the method may further include: storing, by the task allocator, the capability information in a record, wherein the record may include a table.

According to embodiments, the method may further include: receiving, by the task allocator, a test result of the allocated task from the determined test environment; and updating, by the task allocator, the table of the record based on the received test result.

According to embodiments, a system for intelligently determining one or more test environments for testing software of an embedded system may be provided, the system may include: a memory storing instructions; and a task allocator configured to execute the instructions to: obtain capability information of a plurality of test environments; obtain policy information of a task to be executed for testing the software of the embedded system; determine a test environment, from among the plurality of test environments, that satisfies the policy information; and allocate the task to the determined test environment, wherein the embedded system may be an in-vehicle electronic control unit (ECU), and wherein the plurality of tests environments may include at least one software-in-the-loop (SIL) test environment, at least one hardware-in-the-loop (HIL) test environment, and at least one virtual ECU (V-ECU) test environment.

According to embodiments, the capability information may include at least one of processor speed, supported ECU functions, supported instruction sets, and usage cost.

According to embodiments, the task allocator may be further configured to execute the instructions to: receive a test result of the allocated task from the determined test environment; and update the capability information of the determined test environment based on the received test result.

According to embodiments, the task allocator may be further configured to execute the instructions to: determine another test environment, from among the plurality of test environments, based on the received test result; and allocate the task to the determined other test environment.

According to embodiments, the task allocator may be configured to execute the instructions to obtain the policy information by obtaining the policy information of a plurality of tasks. Further, the task allocator may be configured to execute the instructions to determine the test environment by determining plural tests environments, from among the plurality of tests environments, for respectively allocating the plurality of tasks based on the policy information. Furthermore, the task allocator is configured to execute the instructions to allocate the task by allocating the plurality of tasks for simultaneous execution in the plurality of test environments.

According to embodiments, the task allocator may be further configured to execute the instructions to store the capability information in a record, wherein the record may include a table.

According to embodiments, the task allocator may be further configured to execute the instructions to: receive a test result of the allocated task from the determined test environment; and update the table of the record based on the received test result.

According to embodiments, a non-transitory computer-readable recording medium may be provided. The non-transitory computer-readable recording medium may have recorded thereon instructions executable by a task allocator to cause the task allocator to perform a method for intelligently determining one or more test environments for testing software of an embedded system, the method may include: obtaining, by the task allocator, capability information of a plurality of test environments; obtaining, by the task allocator, policy information of a task to be executed for testing the software of the embedded system; determining, by the task allocator, a test environment, from among the plurality of test environments, that satisfies the policy information; and allocating, by the task allocator, the task to the determined test environment, wherein the embedded system may be an in-vehicle electronic control unit (ECU), and wherein the plurality of tests environments may include at least one software-in-the-loop (SIL) test environment, at least one hardware-in-the-loop (HIL) test environment, and at least one virtual ECU (V-ECU) test environment.

According to embodiments, the capability information may include at least one of processor speed, supported ECU functions, supported instruction sets, and usage cost.

According to embodiments, the non-transitory computer-readable recording medium may have recorded thereon instructions executable by the task allocator to cause the task allocator to perform the method, wherein the method may further include: receiving, by the task allocator, a test result of the allocated task from the determined test environment; and updating, by the task allocator, the capability information of the determined test environment based on the received test result.

According to embodiments, the non-transitory computer-readable recording medium may have recorded thereon instructions executable by the task allocator to cause the task allocator to perform the method, wherein the method may further include: determining, by the task allocator, another test environment, from among the plurality of test environments, based on the received test result; and allocating, by the task allocator, the task to the determined other test environment.

According to embodiments, the non-transitory computer-readable recording medium may have recorded thereon instructions executable by the task allocator to cause the task allocator to perform the method, wherein: the obtaining the policy information may include obtaining the policy information of a plurality of tasks; the determining the test environment may include determining plural tests environments, from among the plurality of tests environments, for respectively allocating the plurality of tasks based on the policy information; and the allocating the task may include allocating the plurality of tasks for simultaneous execution in the plurality of test environments.

According to embodiments, the non-transitory computer-readable recording medium may have recorded thereon instructions executable by the task allocator to cause the task allocator to perform the method, wherein the method may further include: storing, by the task allocator, the capability information in a record, wherein the record may include a table.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein:

FIG. 5 illustrates a block diagram of example components of a task allocator system, according to one or more embodiments;

FIG. 7B illustrates a call flow of a non-exhaustive example use case in which the example method in FIG. 7A is implemented, according to one or more embodiments;

FIG. 8A illustrates a block diagram of an example method for managing information, according to one or more embodiments.

DETAILED DESCRIPTION

Figure 1:
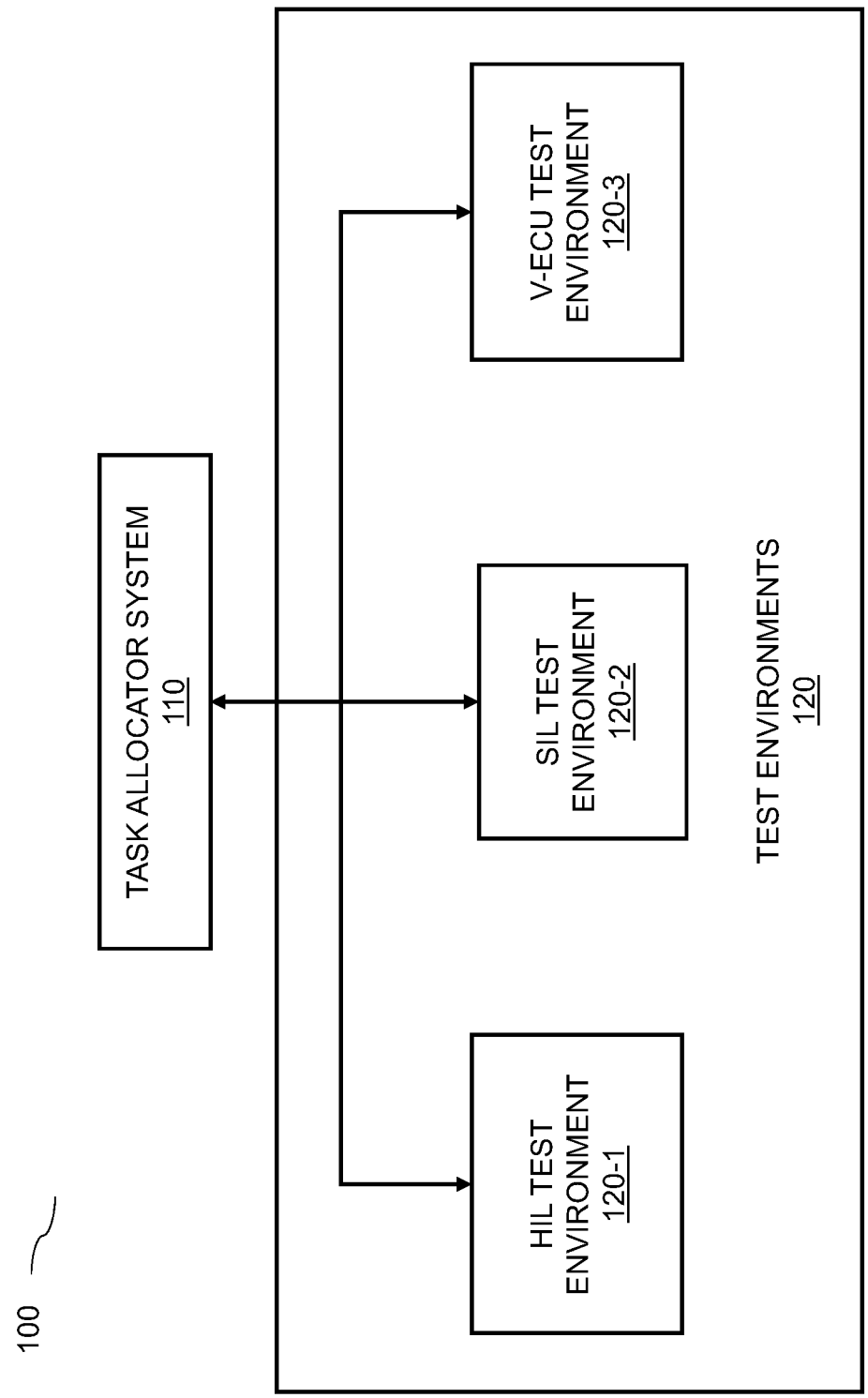
FIG. 1 illustrates a block diagram of a system architecture for intelligently allocating one or more tasks to one or more test environments, according to one or more embodiments.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Further, although the present disclosure is described with reference to embedded system (e.g., electronic control unit (ECU), etc.) of an vehicle, it may be understood that the example embodiments of the present disclosure described herein may also be applicable to any other suitable types of system, such as a radar system, a robotic system, a power system, and the like, without departing from the scope of the present disclosure.

Example embodiments of the present disclosure provide methods, systems, and apparatuses for intelligently determining one or more test environments for testing a software of a system. Specifically, methods, systems, and apparatuses consistent with the example embodiments of the present disclosure provide an intelligent determination of optimal test environment(s) for allocating one or more tasks (e.g., test execution, etc.) based on the requirements of the task and the capability of the available test environment(s).

Ultimately, example embodiments of the present disclosure may utilize a plurality of different types of test environments, which may enable multiple tests to be simultaneously run or be executed in the plurality of test environments under various testing requirements or conditions. Further, by utilizing capability information of the test environments, one or more tasks can be intelligently allocated to optimize the tests and satisfying the variable requirements (speed, cost, etc.) of the one or more tasks.

FIG. 1 illustrates a block diagram of a system architecture 100 for intelligently allocating one or more tasks to one or more test environments, according to one or more embodiments.

Referring to FIG. 1, system architecture 100 may include a task allocator system 110 and a plurality of test environments 120. The task allocator system 110 may be communicatively coupled to each of the plurality of test environments 120, and may be configured to perform operation(s) for intelligently determining one or more test environments from among the plurality of test environments 120, and for allocating one or more tasks (e.g., executing/simulating a test, performing a capability check, scheduling a test execution, etc.) to the determined test environment(s). Further descriptions regarding the components included in the task allocator system 110 are provided below with reference to FIG. 5, and further description of example operations which may be performed by the task allocator system 110 are provided below with reference to FIG. 6 to FIG. 8B.

Additionally, as illustrated in FIG. 1, the plurality of test environments may include at least one hardware-in-the-loop (HIL) test environment 120-1, at least one software-in-the-loop (SIL) test environment 120-2, and at least one virtual electronic control unit (V-ECU) test environment 120-3. Each of the test environments 120-1 to 120-3 may be communicatively coupled to the task allocator system 110 and may provide to and receive from the task allocator system 110 one or more signals, information, data, or the like associated with one or more tasks. Further descriptions regarding the operations of the HIL test environment 120-1 and the components involved therein are provided below with reference to FIG. 2, further descriptions regarding the operations of the SIL test environment 120-2 and the components involved therein are provided below with reference to FIG. 3A and FIG. 3B, and further descriptions regarding the operations of the V-ECU test environment 120-3 and the components involved therein are provided below with reference to FIG. 4A and FIG. 4B.

It can be understood that the test environments 120-1 to 120-3 described hereinabove are merely examples of possible test environments, and the scope of the present disclosure should not be limited thereto. Specifically, more or less test environments may be included in the test environments 120, and/or any other suitable types of test environment (e.g., model-in-the-loop (MIL) test environment, processor-in-the-loop (PIL) test environment, etc.) may be also included in the test environments 120, without departing from the scope of the present disclosure.

Figure 2:
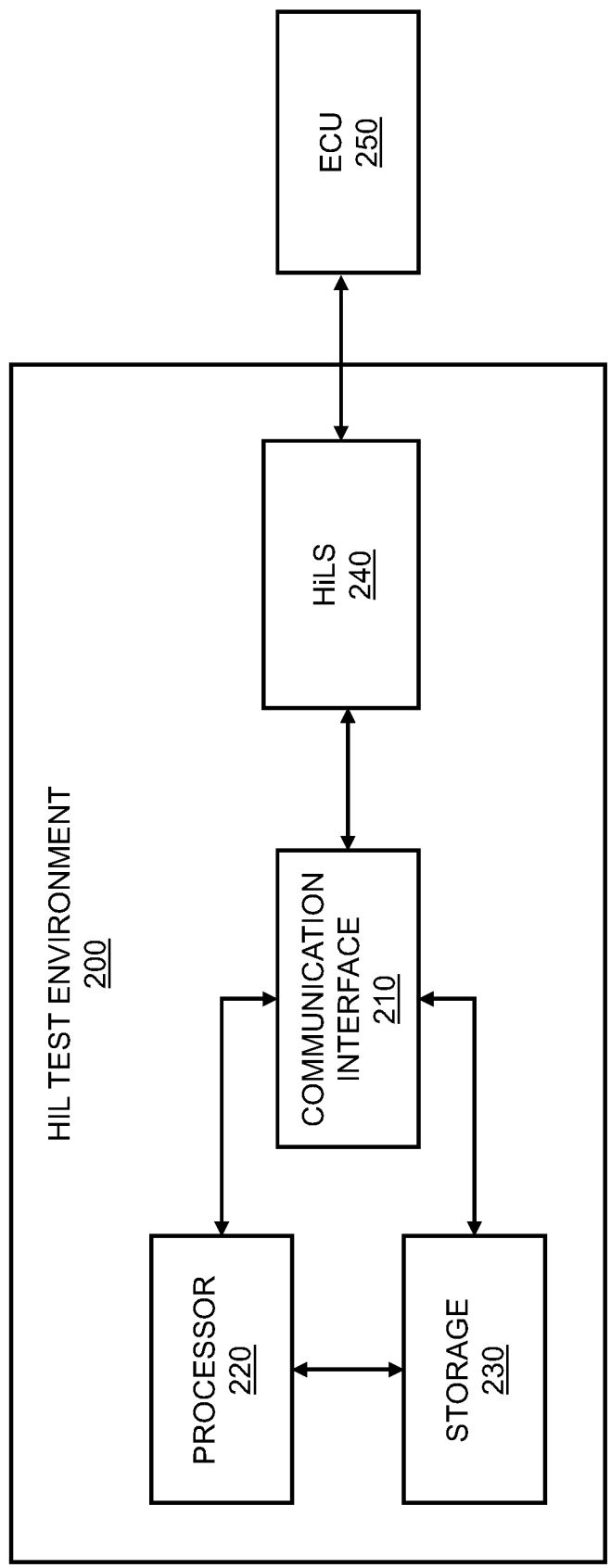
FIG. 2 illustrates a block diagram of an example configuration of a hardware-in-the-loop (HIL) test environment, according to one or more embodiments.

Referring next to FIG. 2, which illustrates a block diagram of an example configuration of a hardware-in-the-loop (HIL) test environment 200, according to one or more embodiments. The HIL test environment 200 may corresponds to the HIL test environment 120-1 in FIG. 1, thus it can be understood that the features described herein with reference to HIL test environments 120-1 and 200 may be applicable to each other, unless being specifically described otherwise.

Generally, the HIL test environment 200 may be configured to manage one or more tasks associated with testing of one or more test objects, such as (but are not limited to) executing or simulating a test, scheduling a test execution, and the like. Specifically, the HIL test environment 200 may be communicatively coupled to one or more developed (or partially developed) hardware/physical components and may simulate reality environments or actual use cases to test or assess the one or more hardware/physical components therewith. For instance, an engine ECU may be developed and be tested before being embedded to a vehicle. In such example, instead of testing the engine ECU with an actual engine, the HIL test environment 200 may perform a simulation comprising hardware and software of the engine that interacts with the engine ECU.

Referring still to FIG. 2, the HIL test environment 200 may include at least one communication interface 210, at least one processor 220, at least one storage 230, and at least one HIL simulator (HiLS) 240. The at least one HILS 240 may be communicatively coupled to at least one electronic control unit (ECU) 250.

The communication interface 210 may include a transceiver-like component (e.g., a transceiver, a separate receiver and transmitter, etc.) that enables the components of HIL test environment 200 to communicate with each other and to communicate with one or more components external to the HIL test environment 200, such as via a wired connection, a wireless connection, or a combination of wired and wireless connections. For instance, the communication interface 210 may couple the processor 220 to the HiLS 240 to thereby enable them to communicate and to interoperate with each other in performing one or more testing/simulations. As another example, communication interface 210 may couple the HIL test environment 200 (or one or more components included therein) to a task allocator system (e.g., task allocator system 110 in FIG. 1, etc.) to thereby enable them to communicate and to interoperate with each other.

According to embodiments, communication interface 210 may include a bus, an Ethernet interface, an optical interface, a coaxial interface, an infrared interface, a radio frequency (RF) interface, a universal serial bus (USB) interface, a Wi-Fi interface, a cellular network interface, a software interface, or the like. According to embodiments, communication interface 210 may include at least one controller area network (CAN) bus configurable to communicatively couple the HIL test environment 200 (or one or more components included therein) with a plurality of ECUs. In some implementations, the CAN bus (or one or more of the associated functions) may be defined in software form via, for example, virtualization (e.g., virtualized network functions, etc.).

The at least one processor 220 may include one or more processors capable of being programmed to perform a function or an operation described herein. For instance, the processor 220 may be configured to execute computer-readable instructions stored in a storage medium (e.g., storage 230, etc.) to thereby perform one or more actions or one or more operations described herein. According to embodiments, the processor 220 may be configured to receive (e.g., via the communication interface 210, etc.) one or more signals defining one or more instructions for performing one or more operations. Further, the processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to receive one or more information/signals from the task allocator system (e.g., task allocator system 110 in FIG. 1), to process or analyze the received information/signals, and to perform one or more actions based on the processing or analyzation. According to embodiments, based on the processing or analyzation, the processor 220 may retrieve one or more information or data stored in the at least one storage 230 and may provide the same to the task allocator system. Further, based on the processing or analyzation, the processor 220 may generate a schedule for executing a test and may store the schedule in the storage 230. Furthermore, based on the processing or analyzation, the processor 220 may trigger, instruct, and/or configure the HiLS 240 to perform or execute one or more testing/simulations.

The at least one storage 230 may include one or more storage mediums suitable for storing data, information, and/or computer readable instructions therein. According to embodiments. The storage 230 may include a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 230 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 230 may be configured to store information associated with capability of the HIL test environment 200, such as (but are not limited to) capacity information of a test server in which the HIL test environment 200 is deployed/hosted, processing power of HiLS 240, historical test results, usage cost, and the like. According to embodiments, the capability information may include processing/testing speed (or parameters by which processing/testing speed can be determined). Further, the storage 230 may store computer-readable instructions which, when being executed by one or more processors (e.g., processor 220), causes the one or more processors to perform one or more actions described herein.

The at least one HiLS 240 may be communicatively coupled to at least one system and may be configured to perform one or more real-time environment simulations or testing on the at least one system. According to embodiments, the HiLS 240 may be communicatively coupled to the at least one system via the communication interface 210.

In the example embodiment illustrated in FIG. 2, the HiLS 240 is communicatively coupled to an ECU (i.e., ECU 250), which may be an embedded system of a vehicle, although it can be understood that any other suitable physical components or systems (e.g., developed hardware, etc.) may also be applicable, without departing from the scope of the present disclosure. The HiLS 240 may be deployed in the form of hardware, software, or a combination thereof. In this regard, the software component(s) (e.g., software programming, functional algorithms, etc.) associated with the HiLS 240 may be hosted or stored in one or more storage mediums communicatively coupled to the HiLS 240 (e.g., the at least one storage 230, etc.).

The HiLS 240 may be configured to perform or execute one or more simulations or testing. According to embodiments, the HiLS may perform electrical emulation of at least one sensor and at least one actuator, which act as the interface between the simulation and the system/hardware component under test. The parameters of each of the electrically emulated sensor and actuator are provided by the HiLS 240 to the ECU 250, and the response and/or performance of the ECU 250 are monitored by the HILS 240. According to embodiments, the HiLS 240 may obtain one or more predetermined configurations or conditions from one or more storage mediums (e.g., storage 230, etc.) and may perform the simulation or emulation based on the predetermined configuration(s) or condition(s). It can be understood that the HiLS 240 may be configured to perform any other suitable operation(s) to simulate or emulate a real environment or use case to test the ECU 250, without departing from the scope of the present disclosure.

The ECU 250 may include any suitable types of embedded system or electronic control unit. According to embodiments, the ECU 250 may include one or more electronic control units utilized for performing one or more operations of a vehicle, such as but are not limited to: an engine ECU, an steering ECU, an infotainment ECU, an ECU for passive safety systems (e.g., airbags, seat belts, etc.), and the like. In this regard, it can be understood that any other suitable system, element or products (e.g., developed hardware, etc.) to be tested may be interchangeable with the ECU 250, without departing from the scope of the present disclosure.

Further, it is contemplated that the HIL test environment 200 described hereinabove is merely an example HIL test environment, and the scope of the present disclosure should not be limited therein. For instance, the HIL test environment may include more or less components as described herein and/or may be configured in a different manner as described herein, without departing from the scope of the present disclosure.

Figure 3A:
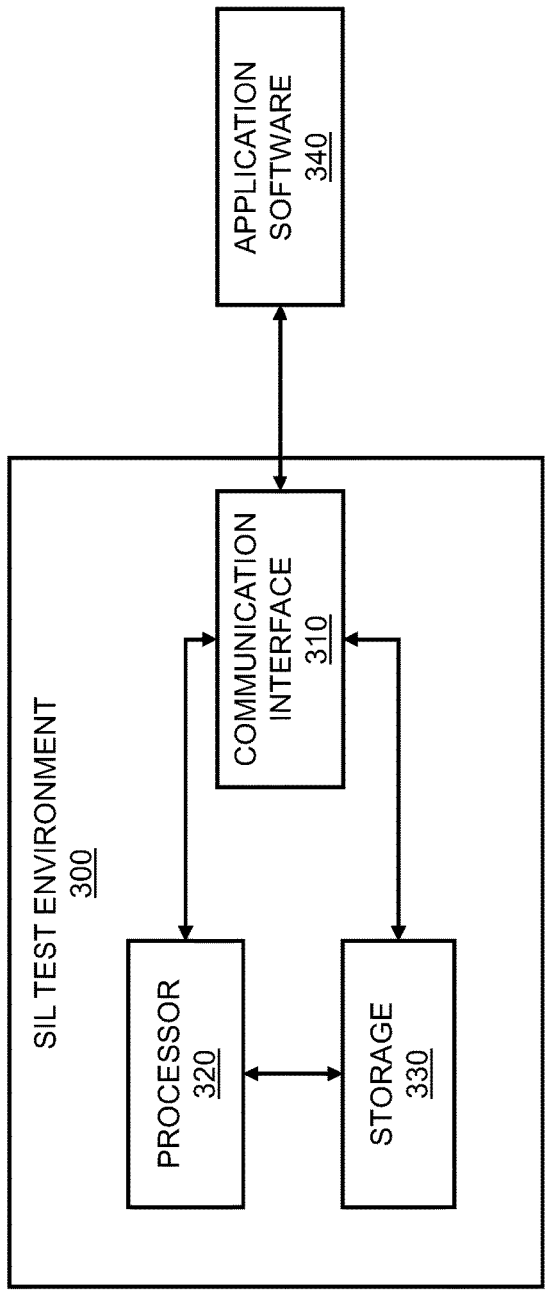
FIG. 3A illustrates a block diagram of an example configuration of a software-in-the-loop (SIL) test environment, according to one or more embodiments.

Referring next to FIG. 3A, which illustrates a block diagram of an example configuration of a software-in-the-loop (SIL) test environment 300, according to one or more embodiments. The SIL test environment 300 may corresponds to SIL test environment 120-2 in FIG. 1, thus it can be understood that the features described herein with reference to SIL test environments 120-2 and 300 may be applicable to each other, unless being specifically described otherwise.

Similar to the HIL test environment 200 described above, the SIL test environment 300 may be configured to manage one or more tasks associated with testing of one or more test objects, such as (but are not limited to) executing or simulating a test, scheduling a test execution, and the like. Nevertheless, unlike the HIL test environment 200 which is communicatively coupled to one or more physical/hardware components and perform testing/simulation thereon, the SIL test environment 300 may simply obtain or receive one or more software components (e.g., application software, virtual functions, programming codes, functional algorithms, etc.) and perform software-based testing/simulation thereon. Simply put, the SIL test environment 300 may be produced, deployed, and run in any suitable computing device or environment, without requiring a connection to the physical/hardware components to-be tested like the HIL test environment 200 does.

Referring to FIG. 3A, the SIL test environment 300 may include at least one communication interface 310, at least one processor 320, and at least one storage 330, each of which may have similar role and functionality of the communication interface 210, the processor 220, and the storage 230 of the HIL test environment 200 in FIG. 2, thus redundant descriptions thereof may be omitted below for conciseness.

In this regard, unlike HIL test environment 200 which include a simulator (e.g., HiLS 240) communicatively coupled to a physical/hardware component, the SIL test environment 300 may utilize at least one software-based SIL simulator (SiLS) to perform one or more testing/simulations on one or more test objects. Namely, the SiLS may be deployed in the form of software application or computer program executable by the processor 320, and may be stored or hosted in the storage 330.

Further, as illustrated in FIG. 3A, at least one application software 340 is provided to the SIL test environment 300 (via communication interface 310) for testing. The at least one application software 340 may be stored in the storage 330 and may be retrieved therefrom for testing when required. According to embodiments, the at least one application software 340 may be hosted or stored in one or more storage mediums external from the SIL test environment 300 (e.g., external server, etc.), and may be fed or provided to the SIL test environment 300 on-the-fly when the testing/simulation is being executed. For instance, upon execution of the testing/simulation, the at least one SiLS being executed by the processor 320 (or any other suitable components of SIL test environment 300) may retrieve or receive (via the communication interface 310) the application software 340 (e.g., the programming codes, the algorithms, etc.) from the one or more external storage mediums in real-time or near real-time, and may perform the testing/simulation thereon.

To this end, the SiLS and the at least one application software may be produced or deployed in any suitable programming languages or computing techniques, such as but are not limited to Java, C++, or the like.

According to embodiments, the SIL test environment 300 may simultaneously perform a plurality of testing/simulations. For instance, the SIL test environment 300 may perform multiple testing/simulations for one application software in parallel, may perform one testing/simulation for multiple application software in parallel, or may perform multiple testing/simulations for multiple application software in parallel.

Figure 3B:
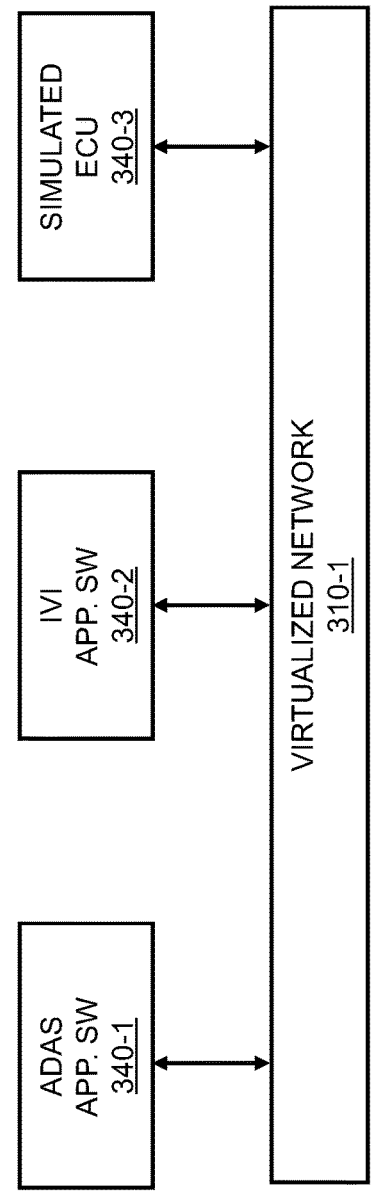
FIG. 3B illustrates a block diagram of a configuration of a plurality of application software, according to one or more embodiments.

FIG. 3B illustrates a block diagram of a configuration of a plurality of application software, according to one or more embodiments. Specifically, FIG. 3B shows an example communication of a plurality of application software, such as an application software 340-1 associated with an advance driver assistance system (ADAS), an application software 340-2 associated with an in-vehicle infotainment (IVI) system, and a simulated ECU 340-3.

The plurality of application software may be communicatively coupled to each other and to the SIL test environment 300 via a virtualized network 310-1. In this regard, it is contemplated that the virtualized network 310-1 described herein may refer to any suitable physical network (e.g., Ethernet, WiFi, etc.) with one or more virtualized network functions (e.g., CAN bus, etc.) implemented therein, which may be configured to couple multiple application software to the SIL test environment 300. The virtualized network 310-1 is merely an example communication channel, and it can be understood that any suitable component (e.g., software interface, etc.) may be utilized alternatively or additionally, in order to couple the multiple application software to the SIL test environment 300. In this way, the SIL test environment 300 may concurrently receive or utilize multiple application software, and may thereby perform multiple testing/simulation thereon in parallel.

It can be understood that the application software 340-1, the application software 340-2, and the simulated ECU 340-3 illustrated in FIG. 3B are merely examples of application software, and any other suitable application software (e.g., application software associated with integrated circuit (IC), central application software, etc.) may be applicable in a similar manner. Further, it can be understood that the configuration of FIG. 3B may also be applicable to multiple programming codes or functional algorithms. For instance, a first algorithm of ADAS and a second algorithm of ADAS may be provided to and be simulated/tested by the SIL test environment in a similar manner as described herein.

Figure 4A:
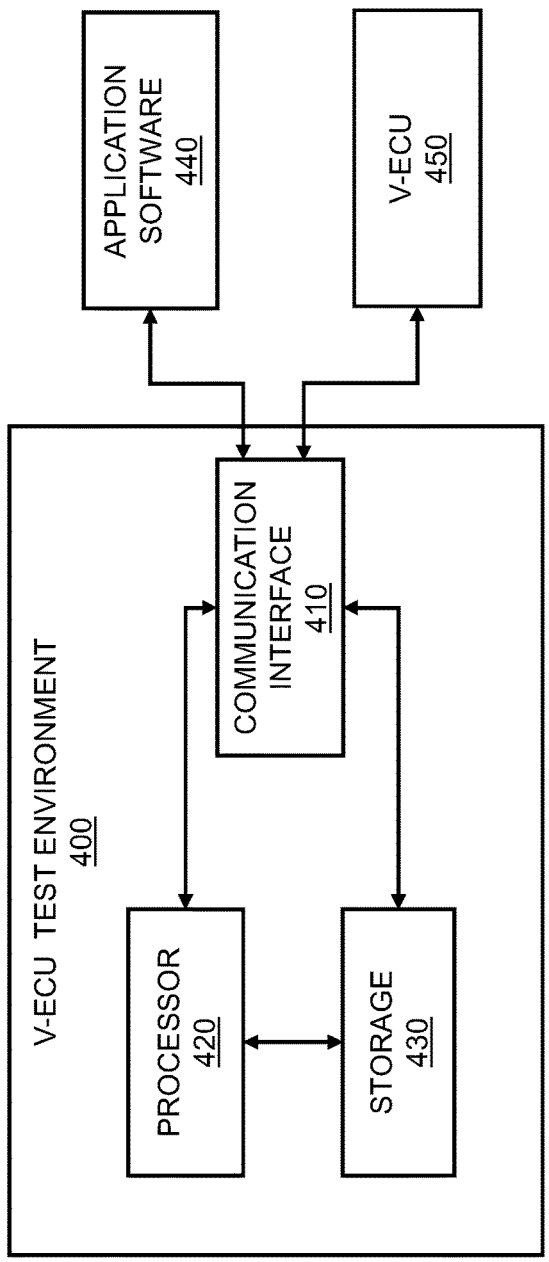
FIG. 4A illustrates a block diagram of an example configuration of a virtual ECU (V-ECU) test environment, according to one or more embodiments.

Referring next to FIG. 4A, which illustrates a block diagram of an example configuration of a virtual ECU (V-ECU) test environment 400, according to one or more embodiments. The V-ECU test environment 400 may corresponds to V-ECU test environment 120-3 in FIG. 1, thus it can be understood that the features described herein with reference to V-ECU test environments 120-3 and 400 may be applicable to each other, unless being specifically described otherwise.

The V-ECU test environment 400 may be similar to the SIL test environment 300 described above with reference to FIG. 3A and FIG. 3B, in that the testing/simulation performed by the V-ECU test environment 400 are also software-based. Referring to FIG. 4A, the V-ECU test environment 400 may include at least one communication interface 410, at least one processor 420, and at least one storage 430, each of which may have similar role and functionality of the communication interface 310, the processor 320, and the storage 330 of the SIL test environment 300 in FIG. 3A, thus redundant descriptions thereof may be omitted below for conciseness.

As illustrated in FIG. 4A, at least one application software 440 may be provided to the V-ECU test environment 400 for testing/simulation. The application software 440 may be similar to application software 340 described above with reference to FIG. 3A and FIG. 3B, thus redundant descriptions thereof may be omitted below for conciseness. Further, in addition to application software (e.g., application software 340/440), at least one V-ECU may also be provided to the V-ECU test environment 400 for testing.

According to embodiments, the V-ECU 450 may be different from the simulated ECU (e.g., an example of application software 340/440) in that the V-ECU 450 may contain application software, programming codes, functional algorithms, or the like, that define a final ECU (e.g., in terms of design, development, production, etc.), while the simulated ECU may contain application software, programming codes, functional algorithms, or the like, that define a generic or non-final ECU.

According to another embodiments, the V-ECU 450 may contain application software, programming codes, functional algorithms, or the like, that defines one or more essential operations or functionalities of an ECU (e.g., central ECU, etc.), and the application software to-be tested/simulated along with the V-ECU 450 may contain application software, programming codes, functional algorithms, or the like, that defines generic or non-essential operations or functionalities of the ECU.

According to embodiments, the V-ECU test environment 400 may simultaneously perform a plurality of testing/simulations. For instance, the V-ECU test environment 400 may perform multiple testing/simulations for one V-ECU in parallel, may perform one testing/simulation for multiple V-ECU in parallel, and/or may perform multiple testing/simulations for at least one V-ECU and at least one application software in parallel.

Figure 4B:
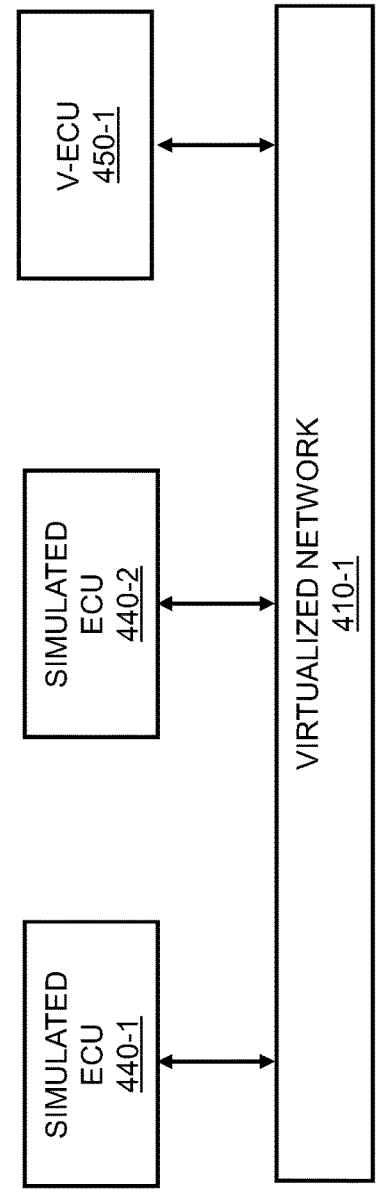
FIG. 4B illustrates a block diagram of a configuration of a V-ECU and a plurality of application software, according to one or more embodiments.

FIG. 4B illustrates a block diagram of a configuration of a V-ECU and a plurality of application software, according to one or more embodiments. Specifically, FIG. 4B shows an example communication between a plurality of simulated ECU 440-1 and 440-2 and a V-ECU 450-1. According to embodiments, the V-ECU 450-1 may include a virtual central ECU. Further, it can be understood that one or more configurations or operations associated with FIG. 4B may be similar to the configurations or operations described above with reference to FIG. 3B, thus redundant descriptions thereof may be omitted below for conciseness.

Referring to FIG. 4B, the plurality of simulated ECU 440-1 and 440-2, and the V-ECU 450-1, may be communicatively coupled to each other and to the V-ECU test environment 400 via a virtualized network 410-1. The virtualized network 410-1 is merely an example communication channel, and it can be understood that any suitable component (e.g., software interface, etc.) may be utilized alternatively or additionally, in order to couple the plurality of simulated ECU 440-1 and 440-2, and the V-ECU 450-1, to the V-ECU test environment. In this way, the V-ECU test environment may concurrently utilize one or more application software along with the V-ECU and perform multiple testing/simulation thereon in parallel.

Referring next to FIG. 5, which illustrates a block diagram of example components of a task allocator system 500, according to one or more embodiments. The task allocator system 500 may corresponds to task allocator system 110 in FIG. 1, thus it can be understood that the features described herein with reference to the task allocator systems 110 and 500 may be applicable to each other, unless being specifically described otherwise.

Referring to FIG. 5, the task allocator system 500 may include at least one communication interface 510, at least one processor 520, and at least one storage 530, each of which may have at least a portion of functionalities, roles, and/or examples similar to the communication interfaces 210/310/410, the processors 220/320/420, and the storages 230/330/430 described hereinabove, thus redundant descriptions associated thereof may be omitted below for conciseness.

In addition, the task allocator system 500 may include at least one input component 540, and at least one output component 550. The at least one input component 540 may include one or more components that permit the task allocator system 500 to receive information (e.g., a touch screen display, a button, a switch, a microphone, a sensor, etc.). The at least one output component 550 may include one or more components that provide output information from the task allocator system 500 (e.g., a display, a speaker, one or more light-emitting diodes (LEDs), etc.).

To this end, the components of the task allocator system 500 may interoperate with each other and/or with one or more components external from the task allocator system 500, to thereby perform one or more operations associated with one or more tasks.

Specifically, the communication interface 510 may communicatively couple the task allocator system 500 (or one or more components therein) to one or more test environments (or the component hosting or deploying the test environment(s), such as a test server), such that the task allocator system 500 may interoperate with the one or more test environments to manage one or more tasks.

Further, the communication interface 510 may communicatively couple the task allocator system 500 (or one or more components therein) to one or more terminals/equipment of a user (e.g., user who would like to specify a policy or a test parameter, etc.) via a wireless network connection and/or via a wired connection, and may receive one or more user inputs from the one or more terminals/equipment. According to embodiments, the one or more user inputs may include information defining a test policy, a test requirement, a test parameter, a test condition, or the like. In this regard, the communication interface 510 may be communicatively coupled to the storage 530 and may provide the received one or more user inputs to the storage 530 to store said received one or more user inputs therein, may be communicatively coupled to the processor 520 and may provide the received one or more user inputs to the processor 520 in real-time or near real-time for processing, may be communicatively coupled to the output component 550 and may provide the received one or more user inputs to the output component 550 such that said one or more user inputs may be outputted (e.g., represented, displayed, etc.) via the output component 550, or the like.

In addition to providing one or more user inputs via a terminal/equipment, the user may also directly provide the one or more user inputs to the task allocator system 500, such as via the input component 540. In this regard, the input component 540 may be communicatively coupled to the storage 530 and may store the received one or more user inputs to the storage 530, may be communicatively coupled to the processor 520 and may provide the received one or more user inputs to the processor 520 in real-time or near real-time for processing, may be communicatively coupled to the output component 550 and may provide the received one or more user inputs to the output component 550 such that said one or more user inputs may be outputted (e.g., represented, displayed, etc.) via the output component 550, may be communicatively coupled to the communication interface 510 and provide the received one or more user inputs to one or more components external from the task allocator system 500 (e.g., for storing, for further processing, etc.), or the like.

The storage 530 may be configured to receive information or data from an external component (via the communication interface 510), from the input component 540, from the processor 520, or the like, and may be configured to store said information or data therein. For instance, the storage 530 may store information or data associated with a policy of a test/simulation, may store information or data associated with historical test/simulation result of the one or more test environments communicatively coupled to the task allocator system, may store information or data associated with capability of said one or more test environments or the like. According to embodiments, the storage 530 may be configured to store the information or data associated with capability of the one or more test environments in a table (or in any other suitable record format).

Further, the storage 530 may provide (e.g., continuously, periodically, in response to a request or an event, etc.) one or more stored data or information to the at least one processor 520. Furthermore, the storage 530 may store computer-readable instructions which, when being executed by the at least one processor 520, causes the at least one processor 520 to perform one or more of the operations discussed herein.

The at least one processor 520 may be configured to intelligently determine one or more test environments for performing one or more testing/simulations for one or more software of a system. Specifically, the processor 520 may determine at least one test environment, from among a plurality of test environments communicatively coupled to the task allocator system 500, that satisfies one or more requirements of a task, and may allocate the task to the determined test environment. Thus, the processor 520 may also be referred to as a "task allocator" herein.

According to embodiments, the processor 520 may be configured to obtain one or more information or data associated with capability (may be referred to as "capability information" herein) of one or more test environments. For instance, the processor 520 may request, retrieve, or receive the one or more capability information from the plurality of test environments (or the component hosting or deploying the plurality of test environments) via the communication interface 510, in real-time, near real-time, or the like. Alternatively or additionally, the processor 520 may request, retrieve, or receive one or more stored capability information from one or more storage mediums (e.g., the storage 530, etc.).

As described above, the capability information may include (but are not limited to) capacity information, processor/testing speed (or parameters by which the speed the processor may perform a test can be determined), emulated or supported functions/algorithms, supported instructions sets, lease fees, usage cost, and the like. By way of example, at least a portion of the capacity information may be obtained (by the test environment(s) or the component(s) associated therewith) via a CPUID instruction by which one or more software can discover details (e.g., capacity, processing power, load, etc.) of the associated components (e.g., processor, etc.).

Further, the processor 520 may be configured to obtain one or more information or data of a policy (may be referred to as "policy information" herein) associated with the task. For instance, the processor 520 may request, retrieve, or receive the one or more policy information from the user (e.g., via input component 540, via terminal/equipment communicatively coupled to the communication interface 510, etc.), in real-time, near real-time, or the like. Alternatively or additionally, the processor 520 may request, retrieve, or receive one or more stored policy information from the storage 530. Furthermore, the processor 520 may obtain the policy information of a plurality of tasks (e.g., tests to be executed, tests to be scheduled, etc.).

The policy information may include one or more information or parameters defining one or more requirements/conditions for assigning the task, such as (but are not limited to) a target test duration, a target cost, a test function, and any other suitable parameters, constrains, or requirements of the test. For example, the policy information may include information defining that a task (e.g., test to be executed) requires a short/long test time, requires a cost within a budget, requires testing on a specific function/algorithm, and/or the like.

According to embodiments, the processor 520 may be configured to determine the test environment (from among the plurality of test environments) that satisfy the policy information of a task, and may allocate the task to the determined test environment thereafter. For instance, the processor 520 may determine, based on the capability information of each of the plurality of test environments, which of the plurality of test environments can perform the testing/simulation according to the requirements/conditions defined in the policy information, and may allocate or assign the task accordingly.

According to embodiments, based on determining that multiple test environments fulfill the requirements/conditions defined in the policy information, the processor 520 may allocate or assign the task to the test environment which may fulfill the most requirements/conditions (e.g., test environment 1 which fulfills three requirements/conditions may be selected over test environment 2 which fulfills two requirements/conditions, etc.), and/or to the test environment which may provide the optimal performance/result (e.g., test environment which may complete the testing/simulation in the shortest duration, test environment which may cost the least, etc.).

According to embodiments, based on determining that none of the plurality of test environments fulfill the requirements/conditions defined in the policy information, the processor 520 may generate a notification message to notify the user (e.g., the user who has requested the testing/simulation, the user who has defined the policy information, etc.) regarding the same.

Alternatively, before generating or providing the notification message to the user, the processor 520 may determine one or more combinations of a portion of the plurality of test environments which may fulfills said requirements/conditions, and allocate/assign the task to the combination of test environments accordingly. For instance, assuming that the plurality of test environments include a test environment 1 and a test environment 2, based on determining that none of test environment 1 and test environment 2 have the capability to fulfill the requirements/conditions defined in the policy information, the processor 520 may determine (based on capability information of test environment 1 and test environment 2) whether or not the test environment 1 and the test environment 2, in combination, may fulfills said requirements/conditions. Based on determining that the test environment 1 and the test environment 2, in combination, may fulfills the requirements/conditions, the processor 520 may appropriately assign/allocate the task to the test environment 1 and the test environment 2 according to the respective available capability (e.g., allocate a portion of task to the test environment 1 and the remaining portion of task to the test environment 2, etc.). Otherwise, the processor 520 may generate and provide the notification message to notify the user that there is no available test environment which can perform testing/simulation according to the policy information.

In view of the above descriptions, it can be understood that the processor 520 may also be configured to allocate or assign a plurality of tasks in a similar manner. For instance, the processor 520 may obtain policy information of a plurality of tasks, may determine one or more test environments (from among the plurality of tests environments) for respectively allocating the plurality of tasks based on the policy information, and may allocate the plurality of tasks for testing/simulation in the determined one or more test environments, in a similar manner as described hereinabove.

Further, according to embodiments, the processor 520 may be configured to generate a record of the received or stored capability information (e.g., stored in the storage 530, etc.). For instance, upon obtaining or receiving a new capability information, the processor 520 may generate the record of the capability information and store the record (e.g., store the record in the storage 530, store the record in an external storage medium communicatively coupled to the task allocator system 500 via communication interface 510, etc.). According to embodiments, the processor 520 may generate the record based on capability information of multiple test environments, wherein the record may include a table containing capability information of each of the multiple test environments.

Furthermore, the processor 520 may be configured to update the record of the capability information. For instance, upon allocating or assigning one or more tasks to the test environment(s), the processor 520 may monitor the performance of the test environment(s), may receive from the test environment(s) one or more test results of assigned task(s), or the like, and may update the associated information in the record accordingly. For instance, whenever the one or more test results indicate a test run failure (such as due to an exception or a timeout without completing the task within a specified time period), the processor 520 may update the record (or the table included therein) so as to not re-assign that same task to that same environment. Similarly, whenever the one or more test results indicate a particular parameter (e.g., time or speed) that is different from that which is estimated from or reflected in the record, the processor 520 may update the record accordingly to more accurately reflect the latest capability of the corresponding test environment.

Additionally, upon receiving a task failure report or determining a task failure, the processor 520 may be configured to reassign the failed task to another test environment(s). For instance, whenever a task failure is reported due to a timeout, the processor 520 may reassign the task to another test environment in which the associated capability information indicates a higher testing speed than the prior test environment to which the tasks was allocated.

Moreover, the processor 520 may be configured to assign one or more tasks based on test results of previous test plans. For instance, a first series of tests or simulations is run to test a software, and the source code of the software is subsequently updated. In this regard, the processor 520 may optimize (e.g., shorten the test run time, etc.) the task allocations for testing the whenever the software with updated source code in a second series of tests or simulations, based on the results of the first series of tests or simulations.

It can be understood that the operations and functionalities of the components in the task allocator system 500 as described hereinabove are merely examples of possible embodiments, and the scope of the present disclosure should not be limited thereto. For instance, the task allocator system 500 may include more or less components as described, one or more components in the task allocator system 500 may be arranged in a different configuration, one or more components in the task allocator system 500 may include more or less functionalities, or the like.

In view of the above, example embodiments of the present disclosure provide a task allocator system which communicatively coupled to a plurality of test environments, wherein the task allocator system may intelligently manage one or more tasks. For instance, the task allocator system may determine an optimal test environment(s) for performing or executing one or more testing/simulations, may keep track and update the capability information of the plurality of test environments, may intelligently assign/reassign one or more tasks based on the updated capability information, or the like. In this regard, the plurality of test environments may include one or more HIL test environments, one or more SIL test environments, and/or one or more V-ECU test environments, though it can be understood that other embodiments are not limited thereto. For example, in other embodiments, other test environments, such as one or more MIL test environments, one or more PIL test environments, or the like, may additionally (or alternatively) be applied.

Further, it is contemplated that one or more of the components, configurations, operations, or the like, described above with reference to FIG. 1 to FIG. 5, may be deployed or implemented in one or more servers, such as a cloud server, a server cluster, and the like. Thus, according to embodiments, the communication between the task allocator system and the plurality of test environments, and the operations involved therein, may be presented in the form of communication between servers.

Figure 6:
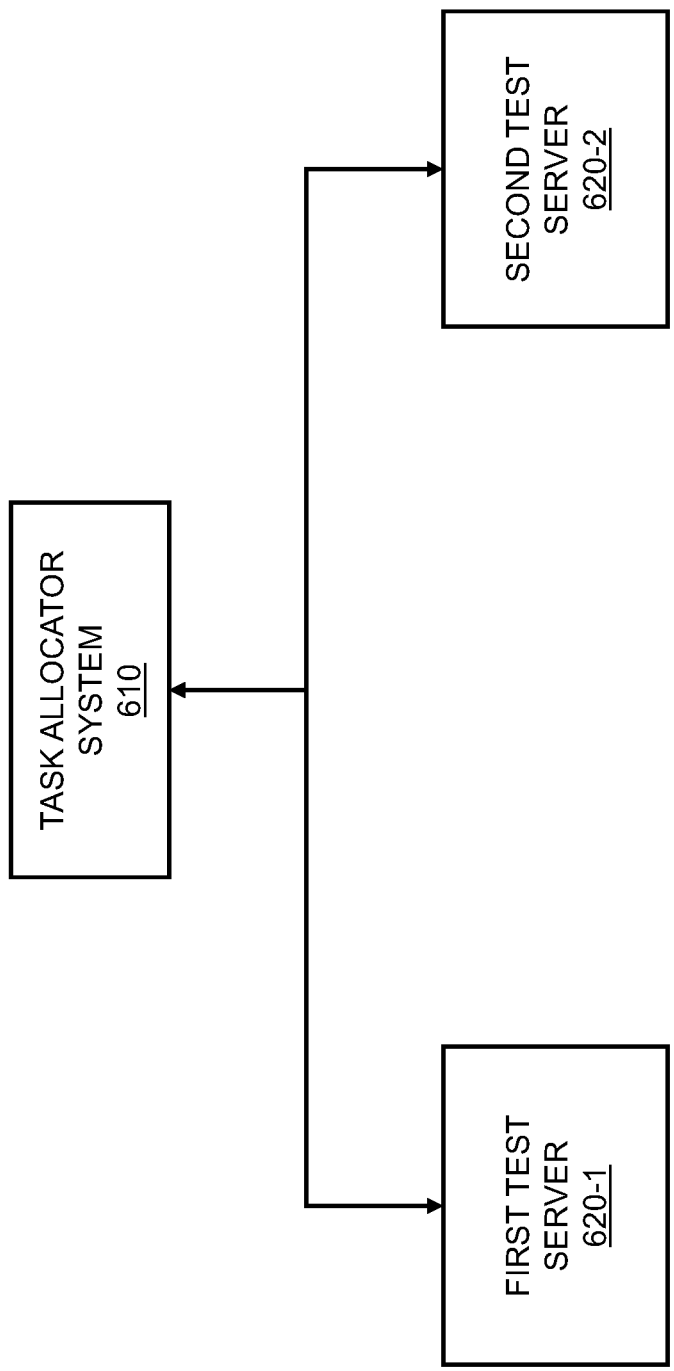
FIG. 6 illustrates a block diagram of an example communication among a task allocator system and a plurality of servers, according to one or more embodiments.

Referring to FIG. 6, which illustrates a block diagram of an example communication among a task allocator system and a plurality of servers, according to one or more embodiments. The task allocator system 610 may corresponds to the task allocator system described hereinabove with reference to FIG. 1 and FIG. 5, and each of the first test server 620-1 and the second test server 620-2 may host or deploy one or more test environments, such as (but are not limited to) one or more HIL test environments, one or more SIL test environments, and/or one or more V-ECU environments, described hereinabove with reference to FIG. 1 to FIG. 4B. Thus, it can be understood that the first test server 620-1 and/or the second test server 620-2 may include one or more components and one or more configurations described hereinabove with reference to FIG. 2 to FIG. 4B.

To this end, the task allocator system 610 may be communicatively coupled to each of the first test server 620-1 and the second test server 602-2. For instance, the communication interface of the task allocator system 610 may be communicatively coupled to the communication interface of said first test server 620-1 and the communication interface of said second test server 620-2, via a wireless network connection and/or a wired network connection. It can be understood that the task allocator system 610 may be communicatively coupled to less than two test servers, more than two test servers, and the like, in a similar manner as described herein, without departing from the scope of the present disclosure.

Next, example embodiments of operations among the task allocator system 610 and the test servers (i.e., the first test server 620-1 and the second test server 620-2) are described below with reference to FIG. 7A to FIG. 8B.

Figure 7A:
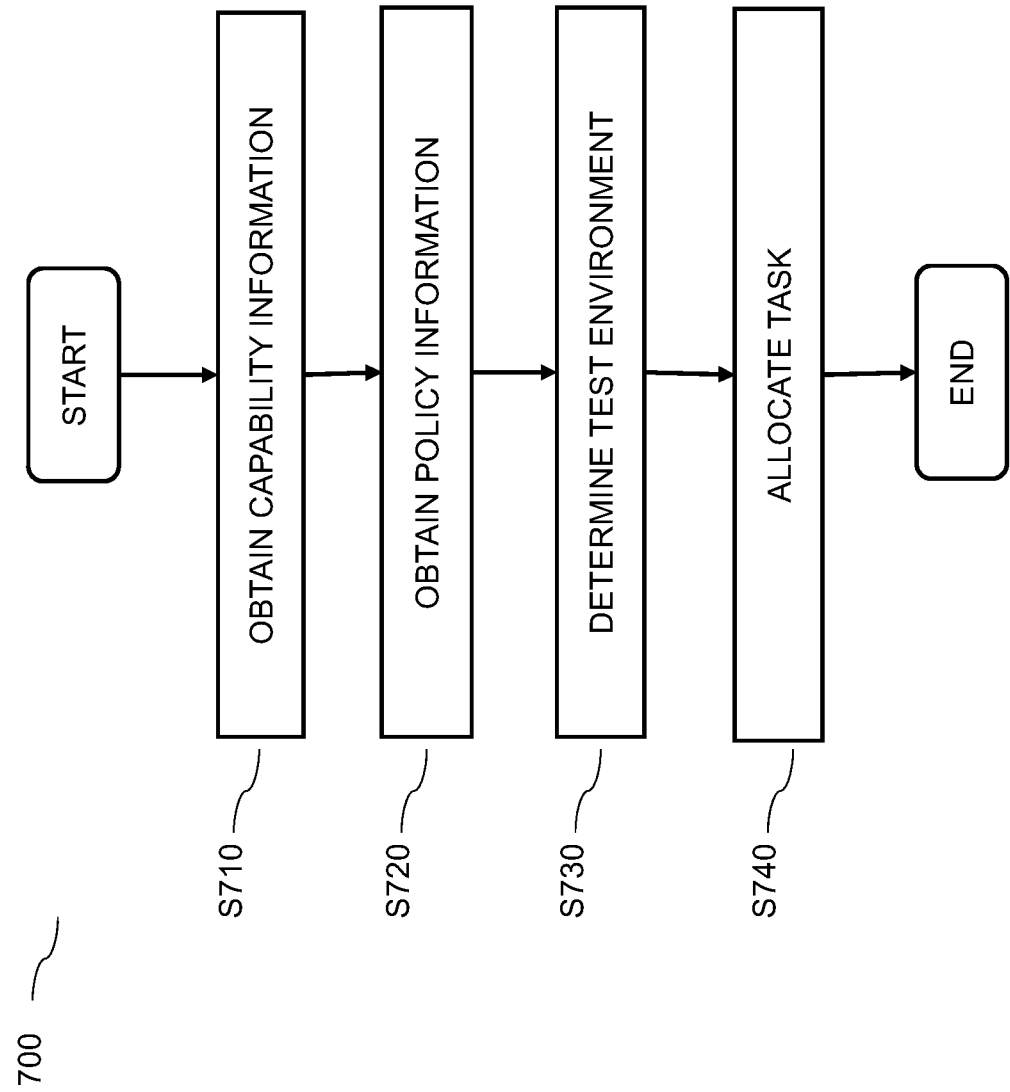
FIG. 7A illustrates a block diagram of an example method for intelligently determining tests environments for testing software of a system, according to one or more embodiments.

Referring first to FIG. 7A, which illustrates a block diagram of an example method 700 for intelligently determining one or more test environments for testing software of a system, according to one or more embodiments. One or more operations of method 700 may be performed by at least one task allocator (e.g., at least one processor, etc.) of the task allocator system 610 in FIG. 6. Further, according to embodiments, the system is an embedded system, such as (but are not limited to) an in-vehicle ECU. Furthermore, test environments associated with one or more operations of method 700 may be deployed or hosted in the first test server 620-1 and the second test server 620-2 in FIG. 6.

Further, FIG. 7B illustrates a call flow of a non-exhaustive example use case in which method 700 is implemented, according to one or more embodiments. Thus, in the following, descriptions of one or more operations of method 700 in FIG. 7A may be provided with reference to FIG. 7B.

As illustrated in FIG. 7A, at operation S710, the task allocator system may be configured to obtain one or more capability information. For instance, the task allocator of the task allocator system may generate a request signal or a query message for requesting capability information of the available test environments (e.g., test environments which has connection with the task allocator system, etc.), and may then send the request signal or the query message to one or more test servers communicatively coupled to the task allocator system. In response, the one or more test servers may provide the latest or most updated capability information to the task allocator system.

Referring to the example use case in FIG. 7B, the task allocator of task allocator system 610 may first obtain, from the first test server 620-1, capability information of one or more test environments hosted or deployed in the first test server 620-1 (at operation S710-1), and then obtain, from the second test server 620-2, capability information of one or more test environments hosted or deployed in the second test server 620-2 (at operation S710-2).

It can be understood that the task allocator may also obtain the capability information from the plurality of test servers in any suitable sequential manner. For instance, the task allocator may simultaneously perform operations S710-1 and S710-2 to concurrently obtain the capability information of the plurality of test environments, may perform operation S710-2 before operation S710-2 to first obtain capability information from the second test server 620-2, or the like.

Referring back to FIG. 7A, at operation S720, the task allocator system may be configured to obtain one or more policy information. For instance, the task allocator may obtain (e.g., from one or more storage mediums, from an user terminal/equipment communicatively coupled to the task allocator system, from an input component, etc.) the policy information of a task to be executed (e.g., executing a test, scheduling a test, etc.) for testing the software of the system.

Further, at operation S730, the task allocator system may be configured to determine at least one test environment. For instance, the task allocator may determine the test environment, from among the plurality of test environments, that satisfies the policy information.

Referring to the example use case in FIG. 7B, upon obtaining the capability information of the plurality of test environments hosted or deployed in the first test server 620-1 and the second test server 620-2, the task allocator of the task allocator system 610-1 may perform a task planning process (which include operations S720 and S730), so as to generate a test plan for executing or running one or more tests/simulations (e.g., in parallel, simultaneously, etc.) across the test environments.

In this regard, the task allocator may generate the test plan based on the capability information and the policy information. For instance, the task allocator may assign the task according to the capability information of each test environment and the assignment policy of the task. Accordingly, the task allocator can determine the optimal test environment which satisfies the requirements (defined in the policy information) of each task. For example, as set forth above, where a policy information for a test defines that the test must be completed within a particular time period, the task allocator may determine, based on the capability information of each of the test environments, which test environment can satisfy the time constraint, and may assign the task to said test environment accordingly.

To this end, it can be understood that one or more operations described above with reference to FIG. 5 may be applicable or be performed by the task allocator in generating the test plan. For instance, the capability information utilized by the task allocator in generating the test plan may include capability information obtained directly from the associated test servers, and/or may include capability information stored in a record described above with reference to FIG. 5, the task allocator may determine one or more optimal test environments in a similar manner as described with reference to the operations of processor 520 in FIG. 5, or the like.

Referring back to FIG. 7A, at operation S740, the task allocator system may be configured to allocate the task. For instance, the task allocator of the task allocator system may generate, based on the policy information of the task, a signal, a message, an instruction, or the like, that includes information of the task (e.g., the schedule for executing the test, the target duration of completion of the test, etc.). Subsequently, the task allocator may provide the generated signal/message/instruction to the test server(s) which is hosting or deploying the determined test environment(s).

Referring to the example use case in FIG. 7B, upon completing the task planning, the task allocator of the task allocator system 610 may first allocate or assign a task to the test environment(s) hosted or deployed in the first test server 620-1 (at operation S740-1), and may then allocate or assign a task to the test environment(s) hosted or deployed in the second test server 620-2 (at operation S740-2).

It can be understood that the task being allocated or assigned at operations S740-1 and S740-2 may be the same, may be different, or may be overlapped in parts. For instance, the task being allocated or assigned at operation S740-2 may be a task of the same series of the task being allocated or assigned at operation S740-1.

As another example, the task may include a plurality of tasks, and the policy information obtained by the task allocator may include policy information of the plurality of tasks. In this regard, the task allocator may determine plural test environments, from among the plurality of test environments, for respectively allocating or assigning the plurality of tasks based on the associated policy information. Accordingly, the task allocator may allocate the plurality of tasks for simultaneous execution in the plurality of test environment.

Further, it can be understood that the task allocator may also allocate or assign the task(s) in any suitable sequence. For instance, the task allocator may simultaneously perform operations S740-1 and S740-2 to concurrently allocate or assign the task(s) to a plurality of test environments, may perform operation S740-2 before operation S740-1 to first allocate or assign the task(s) to the test environment(s) in the second test server 620-2, or the like.

Referring next to FIG. 8A, which illustrates a block diagram of an example method 800 for managing information, according to one or more embodiments. Similar to method 700 in FIG. 7A, one or more operations of method 800 may be performed by at least one task allocator of the task allocator system 610 in FIG. 6. Furthermore, test environments associated with one or more operations of method 800 may be deployed or hosted in the first test server 620-1 and the second test server 620-2 in FIG. 6. In addition, it can be understood that one or more operations of method 800 may be performed in combination with one or more operations of method 700 in FIG. 7A.

Figure 8B:
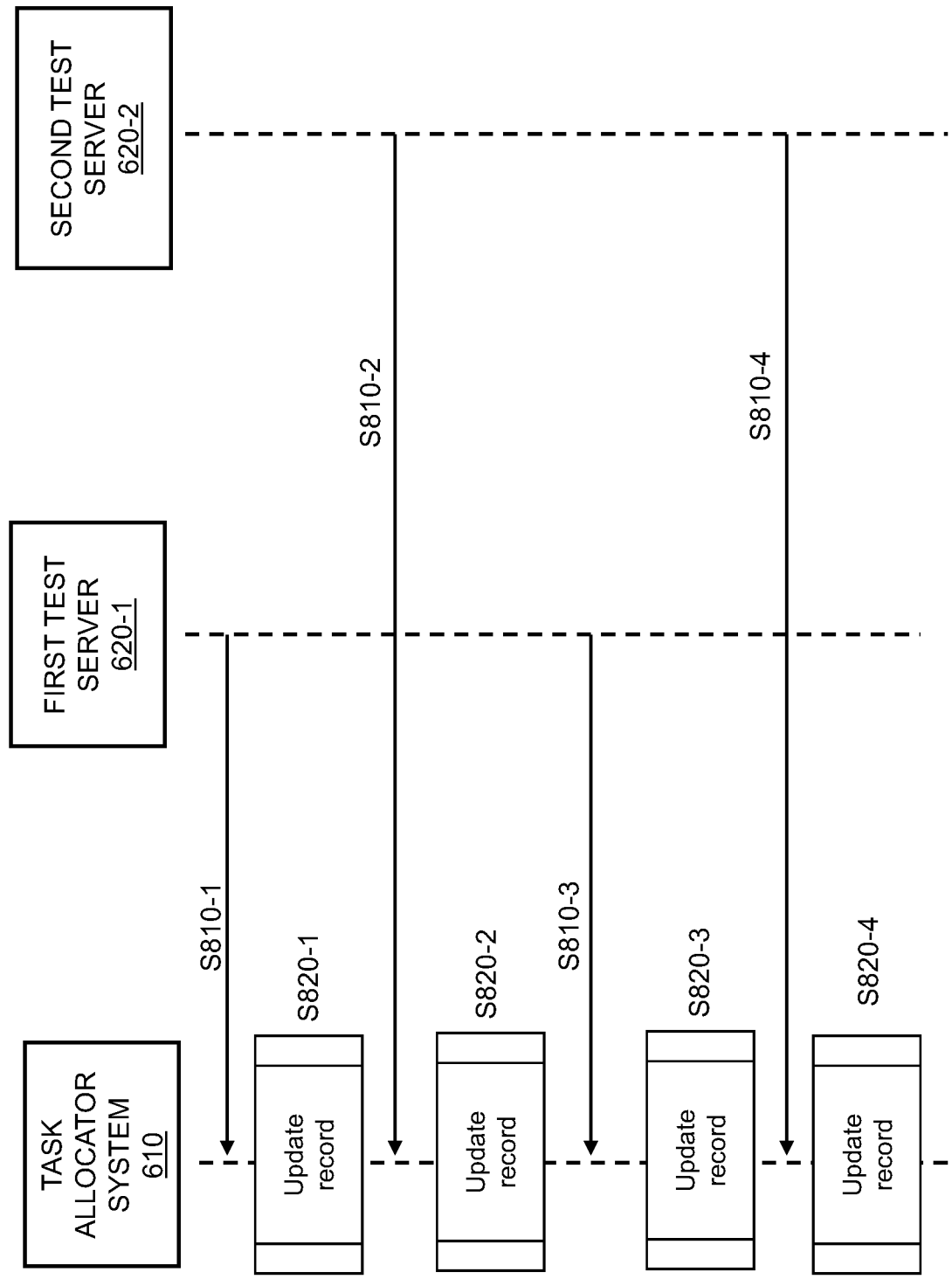
FIG. 8B illustrates a call flow of a non-exhaustive example use case in which the example method in FIG. 8A is implemented, according to one or more embodiments.

Further, FIG. 8B illustrates a call flow of a non-exhaustive example use case in which method 800 is implemented, according to one or more embodiments. Thus, in the following, descriptions of one or more operations of method 800 in FIG. 8A may be provided with reference to FIG. 8B.

As illustrated in FIG. 8A, at operation S810, the task allocator system may receive information. For instance, the task allocator of the task allocator system may receive, from one or more test servers, capability information of test environments hosted or deployed in the one or more test servers. In this regard, operation S810 may be part of operation S710 in FIG. 7A. Alternatively or additionally, the task allocator may receive, from the one or more test servers (or the test environment deployed or hosted therein), one or more test results of the allocated task.

Referring to the example use case in FIG. 8B, at operations S810-1 and S810-2, the task allocator of task allocator system 610 may receive capability information of one or more test environments from the first test server 620-1 and from the second test server 620-2, respectively. Further, at operations S810-3 and S810-4, the task allocator may receive one or more test results of one or more allocated tasks from the first test server 620-1 and from the second test server 620-2, respectively.

It can also be understood that the task allocator may receive the information in any suitable sequence. For instance, the task allocator may simultaneously receive capability information from both the first test server 620-1 and the second test server 620-2, may receive the test result(s) from the second test server 620-2 first before receiving other information, or the like.

Referring back to FIG. 8A, at operation S820, the task allocator system may be configured to manage the received information. For instance, the task allocator of the task allocator system may create a record and store the received information in the record. According to embodiments in which the record has been created, the task allocator may update the information in the record based on the received information.

According to embodiments, the record may include a table, and the task allocator may store the capability information of each of the test environments in the table of the record. In this regard, upon receiving the capability information from the test server(s), the task allocator may simply replace the capability information in the table with the newly received capability information, or may determine a difference(s) between the capability information in the table and the newly received capability information and update the capability information in the table which is different from the newly received capability information accordingly. The task allocator may update the capability information in the table based on the received one or more test results, in a similar manner as described hereinabove.

Referring to the example use case in FIG. 8B, at operations S820-1 and S820-2, the task allocator of task allocator system 610 may update the record (e.g., update the capability information stored in the table of the record) based on capability information of one or more test environments received from the first test server 620-1 and from the second test server 620-2, respectively. Further, at operations S820-3 and S820-4, the task allocator of task allocator system 610 may update the record based on the one or more test results of the one or more allocated tasks received from the first test server 620-1 and from the second test server 620-2, respectively. It can also be understood that the task allocator may update the record in any suitable sequence.

Further, as described above, the operations described above with reference to FIG. 7A to FIG. 8B are merely example embodiments of operations among the task allocator system 610 and the test servers (i.e., the first test server 620-1 and the second test server 620-2). It can be understood that any other suitable operations may be performed, without departing from the scope of the present disclosure. For instance, as described above with reference to FIG. 5, the task allocator (i.e., processor 520) of the task allocator system may allocate or assign one or more tasks based on the test result(s), may optimize the allocation or assignment of one or more tasks based on the test result(s), or the like.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, as described hereinabove, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method for intelligently determining one or more test environments for testing software of an embedded system, the method comprising:
    obtaining, by a task allocator, capability information of the one or more test environments;
    obtaining, by the task allocator, policy information of a task to be executed for testing the software of the embedded system;
    determining, by the task allocator, a test environment, from among the one or more test environments, that satisfies the policy information;
    allocating, by the task allocator, the task to the determined test environment;
    receiving, by the task allocator, a test result of the allocated task from the determined test environment;
    updating, by the task allocator, the capability information of the determined test environment based on the received test result;
    determining, by the task allocator, another test environment, from among the one or more test environments, based on the received test result and the updated capability information; and
    allocating, by the task allocator, the task to the determined other test environment;
    wherein the embedded system is an in-vehicle electronic control unit (ECU), and
    wherein the one or more test environments comprises at least one software-in-the-loop (SIL) test environment, at least one hardware-in-the-loop (HIL) test environment, and at least one virtual ECU (V-ECU) test environment.

2. The method according to claim 1, wherein the capability information comprises at least one of processor speed, supported ECU functions, supported instruction sets, and usage cost.

3. The method as claimed in claim 1, wherein:
    the obtaining the policy information comprises obtaining the policy information of a plurality of tasks;

the determining the test environment comprises determining plural tests environments, from among the one or more tests environments, for respectively allocating the plurality of tasks based on the policy information; and
the allocating the task comprises allocating the plurality of tasks for simultaneous execution in the one or more test environments.

4. The method according to claim 1, further comprising:
storing, by the task allocator, the capability information in a record, wherein the record comprises a table.

5. The method according to claim 4, further comprising:
receiving, by the task allocator, a test result of the allocated task from the determined test environment; and
updating, by the task allocator, the table of the record based on the received test result.

6. A system for intelligently determining one or more test environments for testing software of an embedded system, the system comprising:
a memory storing instructions; and
a task allocator configured to execute the instructions to:
obtain capability information of the one or more test environments;
obtain policy information of a task to be executed for testing the software of the embedded system;
determine a test environment, from among the one or more test environments, that satisfies the policy information;
allocate the task to the determined test environment;
receive a test result of the allocated task from the determined test environment;
update the capability information of the determined test environment based on the received test result;
determine another fest environment, from among the one or more fest environments, based on the received test result and the updated capability information; and
allocate the task to the determined other test environment;
wherein the embedded system is an in-vehicle electronic control unit (ECU), and
wherein the one or more test environments comprises at least one software-in-the-loop (SIL) test environment, at least one hardware-in-the-loop (HIL) test environment, and at least one virtual ECU (V-ECU) test environment.

7. The system according to claim 6, wherein the capability information comprises at least one of processor speed, supported ECU functions, supported instruction sets, and usage cost.

8. The system according to claim 6, wherein:
the task allocator is configured to execute the instructions to obtain the policy information by obtaining the policy information of a plurality of tasks,
the task allocator is configured to execute the instructions to determine the test environment by determining plural tests environments, from among the one or more test environments, for respectively allocating the plurality of tasks based on the policy information; and
the task allocator is configured to execute the instructions to allocate the task by allocating the plurality of tasks for simultaneous execution in the one or more test environments.

9. The system according to claim 6, wherein the task allocator is further configured to execute the instructions to store the capability information in a record, wherein the record comprises a table.

10. The system according to claim 9, wherein the task allocator is further configured to execute the instructions to:
receive a test result of the allocated task from the determined test environment; and
update the table of the record based on the received test result.

11. A non-transitory computer-readable recording medium having recorded thereon instructions executable by a task allocator to cause the task allocator to perform a method for intelligently determining one or more test environments for testing software of an embedded system, the method comprising:
obtaining, by the task allocator, capability information of the one or more test environments;
obtaining, by the task allocator, policy information of a task to be executed for testing the software of the embedded system;
determining, by the task allocator, a test environment, from among the one or more test environments, that satisfies the policy information;
allocating, by the task allocator, the task to the determined test environment;
receiving, by the task allocator, a test result of the allocated task from the determined test environment;
updating, by the task allocator, the capability information of the determined test environment based on the received test result;
determining, by the task allocator, another test environment, from among the one or more test environments, based on the received test result and the updated capability information; and
allocating, by the task allocator, the task to the determined other test environment,
wherein the embedded system is an in-vehicle electronic control unit (ECU), and
wherein the one or more test environments comprises at least one software-in-the-loop (SIL) test environment, at least one hardware-in-the-loop (HIL) test environment, and at least one virtual ECU (V-ECU) test environment.

12. The non-transitory computer-readable recording medium according to claim 11, wherein the capability information comprises at least one of processor speed, supported ECU functions, supported instruction sets, and usage cost.

13. The non-transitory computer-readable recording medium according to claim 11, wherein:
the obtaining the policy information comprises obtaining the policy information of a plurality of tasks;
the determining the test environment comprises determining plural tests environments, from among the one or more test environments, for respectively allocating the plurality of tasks based on the policy information; and
the allocating the task comprises allocating the plurality of tasks for simultaneous execution in the one or more test environments.

14. The non-transitory computer-readable recording medium according to claim 11, wherein the method further comprising:
storing, by the task allocator, the capability information in a record, wherein the record comprises a table.

* * * * *